United States Patent [19]

Hutchison et al.

[11] Patent Number: 5,014,560
[45] Date of Patent: May 14, 1991

[54] TORQUE MEASURING APPARATUS

[75] Inventors: Richard M. Hutchison; David H. Hitt, both of Rockford, Ill.

[73] Assignee: Sundstrand Corporation, Rockford, Ill.

[21] Appl. No.: 350,644

[22] Filed: May 11, 1989

[51] Int. Cl.⁵ .............................................. G01L 3/14
[52] U.S. Cl. .............................. 73/862.33; 250/231.10
[58] Field of Search ................. 73/862.33; 250/231 R, 250/231 SE, 231.10

[56] References Cited

U.S. PATENT DOCUMENTS

| | | | |
|---|---|---|---|
| 1,957,681 | 5/1934 | Thompson . | |
| 2,136,223 | 11/1938 | Thomas | 73/862.33 |
| 2,147,711 | 2/1939 | Martin | 73/862.33 |
| 2,586,540 | 2/1952 | Holden . | |
| 3,111,028 | 11/1963 | Lebow | 73/862.33 |
| 3,625,055 | 12/1971 | Lafourcade . | |
| 3,938,890 | 2/1976 | Flavell . | |
| 3,940,979 | 3/1976 | Ward et al. . | |
| 4,446,746 | 5/1984 | Aoshima et al. . | |
| 4,676,331 | 6/1987 | Iwaki et al. . | |
| 4,693,123 | 9/1987 | Bacardit . | |

*Primary Examiner*—Charles A. Ruehl
*Attorney, Agent, or Firm*—Wood, Phillips, Mason, Recktenwald & VanSanten

[57] ABSTRACT

The problem of providing a high speed torque measuring apparatus (10) is solved by first and second coaxial members (18, 20) having an elastic coupling (25) which interconnects the coaxial members for allowing relative angular displacement in proportion to the magnitude of a torque load applied to one of the members. First and second concentric apertures (32 and 34a, 34b) are provided in the first and second coaxial members, respectively, for movement into overlapping relationship in response to the relative angular displacement of the coaxial members. A light source (40) is provided on one side of the coaxial members for transmitting light through the aperture in both members when in their overlapping relationship whereby the transmitted light intensity is in proportion to the amount of overlap between the apertures. A light intensity detecting device (42) is provided for receiving the light transmitted through the overlapped apertures.

10 Claims, 2 Drawing Sheets

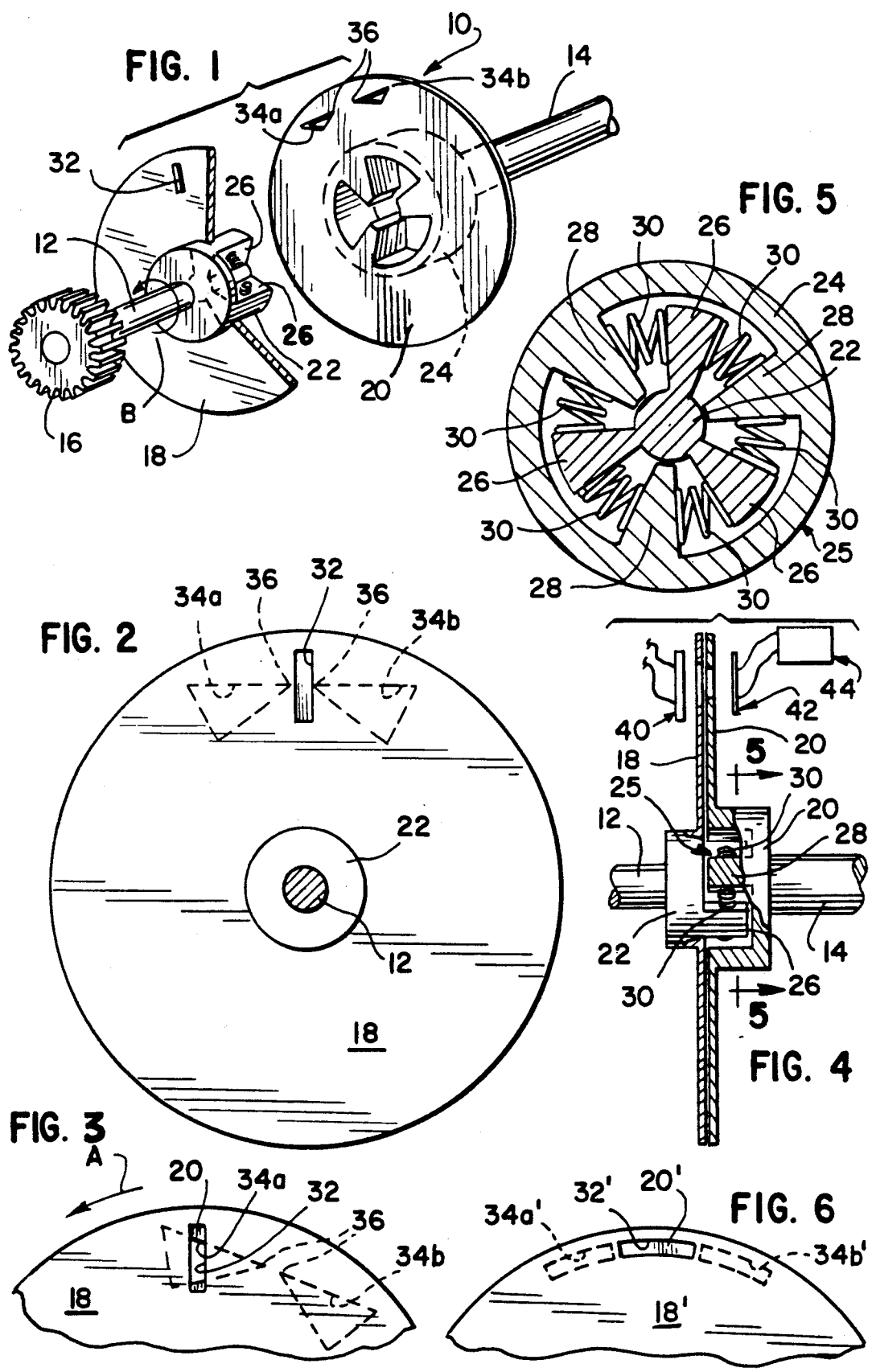

TORQUE MEASURING APPARATUS

FIELD OF THE INVENTION

This invention generally relates to torque measuring devices and, particularly, to a torque measuring apparatus employing a pair of relatively rotatable members having limited angular displacement in response to a torque load.

BACKGROUND OF THE INVENTION

There are a wide variety of known apparatus for measuring the torque transmitted by a rotating member, such as a rotating shaft. Often, torque is measured as a function of relative rotation between an input component and an output component such as coaxial drive shafts connected by an elastic coupling which allows for relative rotation in response to applied torque.

Many such devices use a pair of concentric disks respectively mounted on the relatively rotatable shafts and which rotate relative to one another according to the torsional angular deflection of the shafts. The disks are provided with aperture means in the form of slots, teeth or the like through which light is transmitted from a light source located on one side of the rotating disks to a light pickup located on the opposite side of the rotating disks.

The problem with torque measuring apparatus of the character described above is that complicated electronics often are used and are not appropriate for high speed systems. For example, U.S. Pat. No. 2,586,540 to Holden, dated Feb. 19, 1952, utilizes a summing of pulses from multiple slots. It can be understood that such summing approaches are very difficult to adapt to high speed applications. Another, more recent example is shown in U.S. Pat. No. 4,446,746 to Aoshima et al, dated May 8, 1984, wherein the counting of discrete light transmitting slits are used in relatively rotatable disks. These and other prior approaches to measuring torque also encounter resolution problems with the transmitted light when operating at high speeds.

This invention is directed to solving the problems identified above by providing a very simple torque measuring apparatus which relies simply on the depiction of light intensity wherein a continuously variable signal is produced throughout its operating range in direct proportion to the applied torque.

SUMMARY OF THE INVENTION

An object, therefore, of the invention is to provide a new and improved torque measuring apparatus.

In the exemplary embodiment of the invention, the apparatus includes first and second coaxial members, shown as rotatable members such as coaxial drive and driven shafts. Elastic coupling means interconnect the coaxial members for allowing relative angular displacement therebetween in proportion to the magnitude of a torque load applied to one of the members. A pair of concentric disks are secured to the members so as to be integral therewith.

Generally, first and second aperture means are provided in the first and second coaxial members, respectively, preferably in the rotatable disks. The aperture means are located in radial juxtaposition for movement into overlapping relationship in response to the relative angular displacement of the coaxial members. Light source means are provided for transmitting light through the aperture means in both coaxial members when in their overlapping relationship. Therefore, the transmitted light intensity is in substantially a direct proportion to the amount of overlap between the respective aperture means to provide a simple continuously variable signal throughout the operating range. Light intensity detecting or pickup means are provided for receiving the light transmitted through the overlapped aperture means. As disclosed herein, the light source means and the light intensity detecting means are provided on opposite sides of the disks.

From the foregoing, it can be seen that such a simple system is immune to the speed of the rotating members because only light intensity is detected. In other words, summing, counting or other signal processing of the prior art is completely eliminated.

In one embodiment of the invention, the aperture means includes at least one aperture in a triangular or diverging configuration to magnify the signal as torque increases. In another embodiment of the invention, the respective aperture means in the relatively rotatable disks are radially coextensive and light intensity simply increases or decreases in response to the amount of overlap of the aperture means.

The invention also contemplates a system wherein the torque can be measured in either opposite direction of relative rotation of the rotatable members by providing a bidirectional elastic coupling, along with aperture means in one disk being angularly displaced on both sides of an aperture in the other disk.

Another feature of the invention is the provision of aperture means shaped to correspond to a varying spring constant of the spring means in the elastic coupling to insure that the light intensity passing through the aperture means is in direct proportion to the magnitude of the torque load.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an exploded perspective view of one embodiment of a torque measuring apparatus embodying the concepts of the invention;

FIG. 2 is an enlarged end elevational view of the apparatus as viewed looking at the left-hand disk in FIG. 1, showing the aperture means in a neutral or light non-transmitting condition;

FIG. 3 is a fragmented elevational view of the top portion of FIG. 2, illustrating a light transmitting condition of the disks;

FIG. 4 is a fragmented vertical section through the disks and the elastic coupling of the apparatus;

FIG. 5 is an enlarged section through the elastic coupling, taken generally along line 5—5 of FIG. 4;

FIG. 6 is a view similar to that of FIG. 5, illustrating an alternate embodiment of the light transmitting aperture means.

DETAILED DESCRIPTION OF THE PREFERRED EMBODIMENTS

Figure 7:
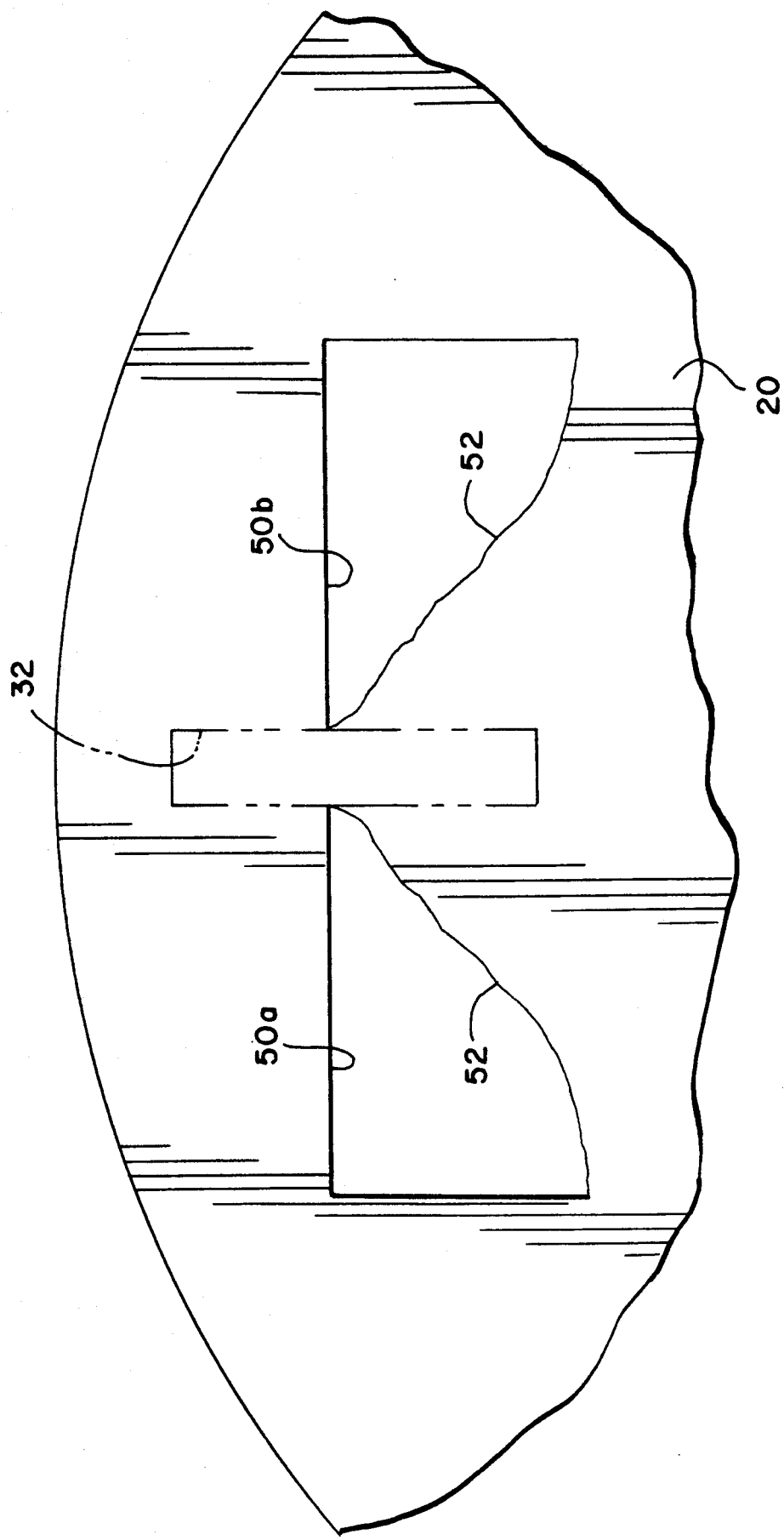
FIG. 7 is a view similar to that of FIG. 3, but showing aperture means shaped to correspond to the spring constant in the elastic coupling.

Referring to the drawings in greater detail, and first to FIG. 1, a torque measuring apparatus embodying the concepts of the invention is generally designated 10 and includes first and second coaxially rotatable members, such as a drive shaft 12 and a driven shaft 14. A drive gear 16 is shown coupled to drive shaft 12 for illustration purposes only, in that the drive gear can be part of a drive train to an appropriate power source.

A pair of disks 18 and 20 are fixed to drive shafts 12 and 14, respectively, for conjoint rotation therewith and for relative angular displacement integrally with any angular displacement of the drive and driven shafts. Of course, it can be understood that the disks can be formed integral with the shafts and, to that end, including the claims hereof, the disks are considered to be coaxially rotatable members in the system.

Actually, in the embodiment of the invention shown in the drawings, drive disk 18 and driven disk 20 are part of a pair of hubs 22 and 24, respectively, splined to drive shaft 12 and driven shaft 14, respectively.

Referring to FIGS. 4 and 5 in conjunction with FIG. 1, hubs 22 and 24 form portions of an elastic coupling means, generally designated 25, interconnecting drive shaft 12 and driven shaft 14 and, in turn, drive disk 18 and driven disk 20, for conjoint rotation while allowing relative angular displacement therebetween in proportion to the magnitude of a torque load applied to one of the relatively rotatable members. More particularly, hub 22 has a plurality of outwardly opening or radially projecting teeth 26 which are angularly spaced as best shown in FIG. 5. Hub 24 has a plurality of radially inwardly projecting teeth 28 disposed between and spaced angularly from the adjacent teeth 26 of hub 22. Coil springs 30 are sandwiched between each opposite side of each tooth 26 and the opposed side of the respectively adjacent tooth 28. Therefore, not only is an elastic coupling provided between the relatively rotatable members of the apparatus, but relative angular rotation of shafts 12 and 14 as well as relative angular displacement of disks 18 and 20 are allowed in either opposite direction of rotation.

First aperture means 32 is provided in drive disk 18, in the form of a rectangular slot oriented longitudinally in a radial direction. Second aperture means 34a and 34b are provided in driven disk 20, in the form of a pair of triangular openings with apexes 36 pointing inwardly toward each other.

Referring specifically to FIG. 2, it can be seen that openings 34a and 34b (i.e. apexes 36) in driven disk 20 are spaced at least the width of slot 32 in drive disk 18. This relative positioning of the aperture means corresponds to a neutral condition of the apparatus as represented by the condition of the elastic coupling means shown in FIG. 5. In other words, when shafts 12 and 14, along with their respective disks 18 and 20, are rotating conjointly at a given torque predetermined by springs 30, slot 32 in disk 18 is axially "blocked" by the solid area of disk 20 between openings 34a and 34b. This condition would represent a no-torque load condition of the apparatus as defined by the predetermined forces of springs 30.

Referring to FIG. 4, a light source, generally designated 40, is provided on one side of disks 18,20. Preferably, the light source is isotropic. A light intensity detecting means, generally designated 42, is provided on the opposite side of disks 18,20. The light intensity detecting means is electrically coupled to an appropriate sample and hold circuit, generally designated 44. It can be seen that light source or transmitting means 40 and light detecting or pickup means 42 are designed simply to detect light intensity in accordance with the concepts of the invention. As stated above, such a system would be immune to high speed rotation.

In addition, it can be seen that the light transmitting/pickup means actually are picking up a pulse as the shafts 12,14 and disks 18,20 rotate; that is in the event that there is any overlapping relationship between slot 32 and either of openings 34a,34b. Since a pulse is being picked up, in order to apply the principles to high speed applications, light intensity detecting means 42 should be an optical device with a high rise time so as not to cut off before peak light is picked up. To that end, light intensity detecting means comprises a phototransistor in comparison to photocells as is predominantly used with many torque measuring apparatus. A photocell might be applicable at lower speeds, but a phototransistor is applicable on the order of 30,000 or more rpm's.

In operation, reference is made to FIG. 2 in comparison to FIG. 3. As stated above, FIG. 2 represents a neutral position wherein light from source 40 cannot be transmitted to light detecting means 42 because slot 32 in disk 18 is blocked by the area of disk 20 between openings 34a,34b. Should a torque load be applied between shafts 12 and 14, in either direction, relative rotation between the shafts would be effected as afforded by the elastic coupling means shown in FIG. 5. Correspondingly, relative angular displacement would be effected between disks 18 and 20, depending upon the direction of the torque load. For instance, FIG. 3 shows that disk 18 has been caused to be angularly displaced relative to disk 20 in the direction of arrow A. In other words, assuming that drive shaft 12 normally is driven in the direction of B (FIG. 1), this condition might occur during start-up On the other hand, should the drive shaft be driven in the opposite direction, this condition might occur should there be a backdrive in the system from driven shaft 14.

In any event, it can be seen in FIG. 3 that rectangular slot 32 in disk 18 now overlaps triangular opening 34 in disk 20. In this condition, light can be transmitted from light source 40 and picked up by light-intensity detecting means 42 on each revolution of the shafts and disks, as long as the torque load condition persists. By using two openings 34a,34b on opposite sides of the neutral position of slot 32, bidirectional torque load detection can be accomplished. In other words, should drive shaft 12 be driven in the direction of arrow "B" (FIG. 1) such a condition might exist in response to a backdrive torque load on shaft 14, whereupon slot 32 would overlap opening 34b similarly to the condition where the slot is overlapping opening 34a in FIG. 3.

By configuring slot 32 with a rectangular configuration which presents a constant angular width, and configuring openings 34a,34b with a triangular shape as described, a greater torque will effect a greater relative angular displacement of the disks and, in turn increase the light transmitting area through the overlapped aperture means. Therefore, the intensity of the transmitted light will be in proportion to the torque load.

FIG. 6 shows an alternate embodiment of the invention wherein an arcuate slot 32' is shown in a drive disk 18' which, when in neutral condition, is blocked by a driven disk 20'. A pair of concentric arcuate slots 34a' and 34b' are provided in disk 20' similar to triangular slots 34a, 34b described above in relation to the embodiment of FIGS. 2 and 3. Again, when in neutral condition, it can be seen that slot 32' in disk 18' is "blocked" by the area of disk 20' between slots 34a' and 34b'. When relative angular displacement of the disks is effected by relative rotation of the respective shafts in response to a torque load, slot 32' will overlap with either slot 34a' or 34b' depending upon the direction of relative angular displacement. Consequently, again, the greater the degree of overlap, the greater will be the transmitting area through the disks, resulting in a proportional relationship between the intensity of transmitted light and the amount of applied torque load.

FIG. 7 shows a feature of the invention wherein the aperture means, similar to aperture means 34a and 34b, in driven disk 20 are shaped according to the spring "constant" of coil springs in elastic coupling 25. More particularly, although apertures 34a, 34b and apertures 34a', 34b' are effective to allow for the passage of light such that the light intensity is proportionate to the applied torque load, very precise allowance can be made for variances in the spring reactionary forces which may vary. In other words, springs 30 are shown in FIG. 5 in a substantially 100% elongated condition. Upon the application of a torque load to the elastic coupling, the springs are compressed and may be compressed all the way until their adjacent turns touch. During this compression "travel", the coils springs do not apply a reacting force along a straight line curve. The reactionary forces actually vary between 100% elongation of the springs and a condition wherein adjacent turns touch.

Consequently, FIG. 7 shows apertures 50a and 50b wherein one side 52 of each aperture is shaped to correspond to the reactionary or restoring force of a coil spring. Of course, the particular configuration of a side 52 of an aperture would depend upon the given restoring force curve of whatever type of spring is being used in the elastic coupling, the configuration shown being that of a coil spring.

By correlating the aperture shape with the variables of the spring means, as exemplified in FIG. 7, the relationship between the passed light intensity and the applied torque load is as close to a direct proportion as possible since the spring variables are eliminated by the compensatory aperture shape.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A torque measuring apparatus, comprising:
   first and second coaxial members;
   elastic coupling means interconnecting the first and second coaxial members for allowing relative angular displacement therebetween in proportion to the magnitude of a torque load applied to one of the members;
   first and second concentric apertures in the first and second coaxial members, respectively, for movement into overlapping relationship in response to said relative angular displacement of the members, the first aperture having a constant width in an angular direction and the second aperture having a varying width in an angular direction;
   a light source for transmitting light through the apertures in both coaxial members when in said overlapping relationship whereby the transmitted light intensity is in proportion to the amount of overlap between the respective apertures; and
   light intensity detecting means for receiving the light transmitted through the overlapping first and second apertures.

2. The torque measuring apparatus of claim 1 wherein said second aperture diverges from an apex near the first aperture to increase the transmitted light in response to increased overlapping of the first and second apertures.

3. The torque measuring apparatus of claim 2, including a pair of diverging second apertures having apexes on opposite sides of the first aperture.

4. A torque measuring apparatus, comprising:
   first and second coaxial members;
   elastic coupling means interconnecting the first and second members for allowing relative angular displacement therebetween in proportion to the magnitude of a torque load applied to one of the members;
   a single aperture in the first coaxial member and a pair of apertures in the second coaxial member, with one of the pair of apertures being located on each opposite radial side of the single aperture for respective movement into overlapping relationship in response to said relative angular displacement of the coaxial members whereby the apparatus is bidirectional;
   a light source for transmitting light through the apertures in both coaxial members when in said overlapping relationship whereby the transmitted light intensity is in proportion to the amount of overlap between the respective apertures; and
   light intensity detecting means for receiving the light transmitted through the overlapping apertures.

5. A torque measuring apparatus, comprising:
   first and second coaxial members;
   elastic coupling means interconnecting the first and second coaxial members for allowing relative angular displacement therebetween in proportion to the magnitude of a torque load applied to one of the members;
   first and second concentric apertures in the first and second coaxial members, respectively, for movement into overlapping relationship in response to said relative angular displacement of the members, at least one of said first and second apertures being variably shaped according to a restoring force curve of the elastic coupling means;
   a light source for transmitting light through the apertures in both coaxial members when in said overlapping relationship whereby the transmitted light intensity is in proportion to the amount of overlap between the respective apertures; and
   light intensity detecting means for receiving the light transmitted through the overlapping first and second apertures.

6. A torque measuring apparatus, comprising:
   first and second coaxial members;
   elastic coupling means interconnecting the first and second coaxial members for allowing relative angular displacement therebetween in proportion to the magnitude of a torque load applied to one of the members;

first and second concentric apertures in the first and second coaxial members, respectively, for movement into overlapping relationship in response to said relative angular displacement of the coaxial members, the first aperture being in the form of an elongated slot of constant width oriented longitudinally in a radial direction, and the second aperture being in the form of a generally triangular opening having an apex pointing toward the slot;

a light source for transmitting light through the apertures in both coaxial members when in said overlapping relationship whereby the transmitted light intensity is in proportion to the amount of overlap between the respective apertures; and light intensity detecting means for receiving the light transmitted through the overlapping first and second apertures.

7. The torque measuring apparatus according to claim 6, including a pair of generally triangular openings in said second coaxial member, with one on each opposite radial side of the slot and with the apexes thereof pointing toward the slot whereby the apparatus is bidirectional.

8. The torque measuring apparatus of claim 7 wherein one side of each said generally triangular opening follows a line representing the restoring force curve of the elastic coupling means.

9. The torque measuring apparatus according to claim 6 wherein said second aperture is variably shaped according to a restoring force curve of the elastic coupling means.

10. The torque measuring apparatus of claim 6 wherein said light intensity detecting means comprises a phototransistor.

* * * * *